No. 761,870. Patented June 7, 1904.

UNITED STATES PATENT OFFICE.

ARTHUR W. BAXTER, OF LONDON, ENGLAND.

PROCESS OF MAKING FIREPROOFING SOLUTIONS.

SPECIFICATION forming part of Letters Patent No. 761,870, dated June 7, 1904.

Application filed March 23, 1903. Serial No. 149,151. (No specimens.)

*To all whom it may concern:*

Be it known that I, ARTHUR WILLIAM BAXTER, a subject of the King of the British Dominions, residing in London, England, (whose post-office address is Ardingley House, Parson's Green, London, England,) have invented certain new and useful Improvements Relating to Processes for the Manufacture of Fireproofing Solutions, (for which I have applied for a patent in Great Britain on the 20th day of September, 1902, and in Germany on the 2d of March, 1903,) of which the following is a specification.

The usual method of fireproofing wood and other organic matter consists in impregnating it with a solution of suitable salts—such as, for instance, sulfate of ammonia. This salt, however, has defects, inasmuch as it is hygroscopic articles treated with it absorb water and cause iron and steel to rust. Numerous other solutions have been tried or proposed which are satisfactory for the purpose in some respects, but the drawbacks accompanying their use outweigh the advantages. In some cases the wood is subjected to two impregnations, the first serving to force into the pores of the wood a suitable salt, which pores are subsequently closed by the second impregnation. This method is, however, unnecessarily expensive. Silicate of soda and of potash will also resist heat, and are therefore used for the manufacture of fireproof paint, but their aqueous solutions will not remain liquid long enough to render them suitable for the impregnation of wood. A mixture of bisulfate of ammonia in aqueous solution with a solution of an alkali silicate to be used in the shape of small jets has been recommended for the extinction of fire, but would not be suitable as a solution for the impregnation of wood, because the addition of bisulfate of ammonia to an alkali-silicate solution would immediately precipitate gelatinous silica. I have found that these defects may be avoided and an efficient and cheap fireproofing solution obtained which is comparatively non-hygroscopic and has no corrosive action on metals by mixing a solution of sulfate of ammonia with a solution of silicates of soda and of potash prepared in the manner hereinafter described and neutralizing the mixture with an acid. The mixture obtained as described will remain liquid for an indefinite length of time, so that it can be used repeatedly for the impregnation of wood, and it combines high efficiency with cheapness.

Two and three-eighths parts, by weight, of silica are fused together with five and three-fourths parts of potassium carbonate and four parts of sodium carbonate. After the escape of gases has ceased the fused mass is poured into fifty-two and one-fourth parts of water and boiled for about thirty minutes and then allowed to cool and filtered. A separate solution is made up of thirteen and three-fourths parts of sulfate of ammonia in seventy-two parts of water. The two solutions thus prepared are mixed together in equal quantities and sulfuric acid is then added until the solution has a slightly acid reaction when tested with litmus-paper.

The strength of the impregnating solution and the relative quantities of its constituents may be varied, according to the nature of the material to be treated with it, but the solution of silica added to the ammonium sulfate should be prepared with an excess of alkali carbonate—that is to say, more than is required for converting the silica into alkali silicate.

The method of impregnation may be the same as that adopted with other impregnating solutions.

What I claim is—

1. The process for obtaining a fireproofing solution, which consists in fusing sodium and potassium carbonate together with silica, dissolving the fused mass in water, mixing the solution with an aqueous solution of ammonium sulfate, and neutralizing the mixture, substantially as described and for the purpose specified.

2. The process for obtaining a fireproofing solution, which consists in fusing silica together with an excess of alkali carbonate, dissolving the fused mass in water, mixing the solution with a solution of ammonia sulfate in water, and neutralizing the mixture, substantially as described.

3. The process for the manufacture of a fireproofing solution which consists in fusing silica together with sodium carbonate and potassium carbonate approximately in the proportions described, dissolving the fused mass in hot water and mixing the solution with an aqueous solution of ammonium sulfate approximately in the proportion described and neutralizing the mixture with sulfuric acid.

In witness whereof I have hereunto signed my name in the presence of two subscribing witnesses.

ARTHUR W. BAXTER.

Witnesses:
J. WETTER,
WALTER E. ROCHE.